No. 798,957. PATENTED SEPT. 5, 1905.
P. E. GOOD.
SPREADER FOR THRESHING MACHINES.
APPLICATION FILED JAN. 21, 1905.
2 SHEETS—SHEET 1.
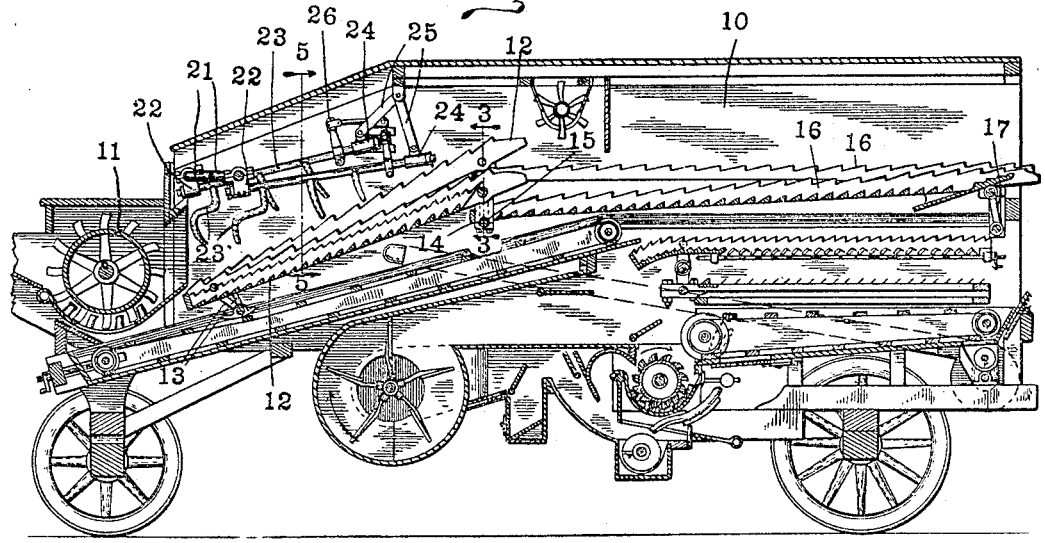
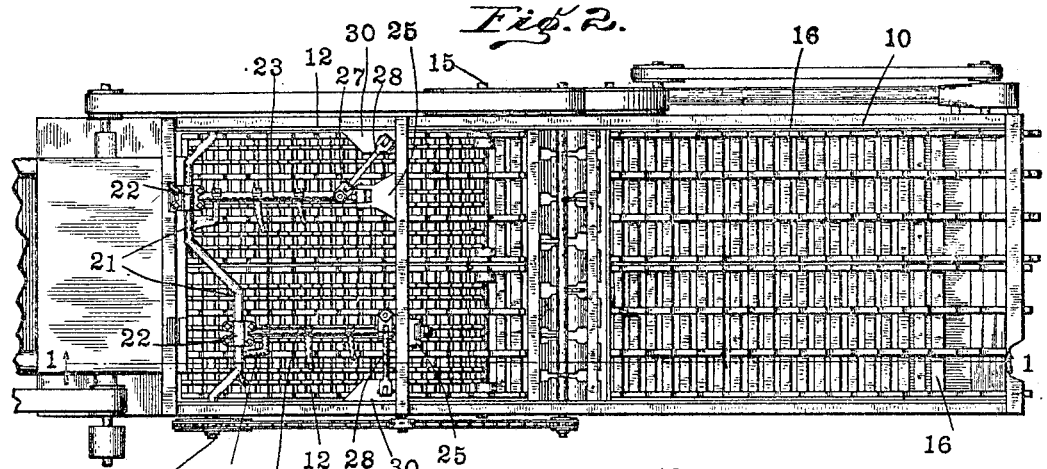
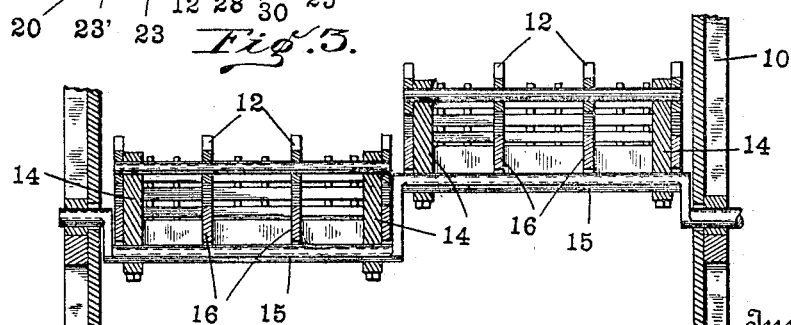
Witnesses
Frank A. Fahle
J. A. Walsh
Inventor
Peter E. Good
By
Bradford Hood
Attorneys No. 798,957. PATENTED SEPT. 5, 1905.
P. E. GOOD.
SPREADER FOR THRESHING MACHINES.
APPLICATION FILED JAN. 21, 1905.
2 SHEETS—SHEET 2.
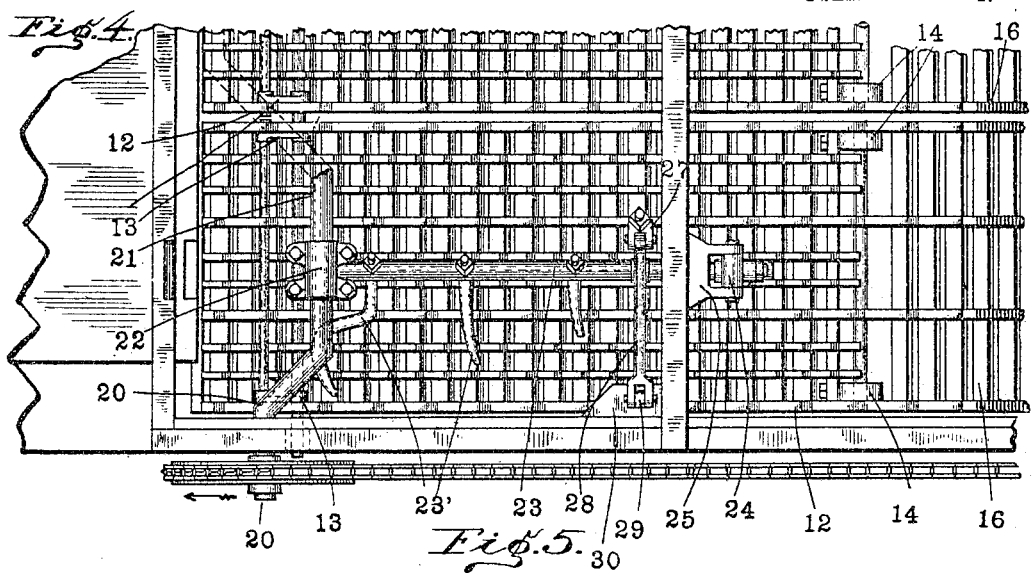
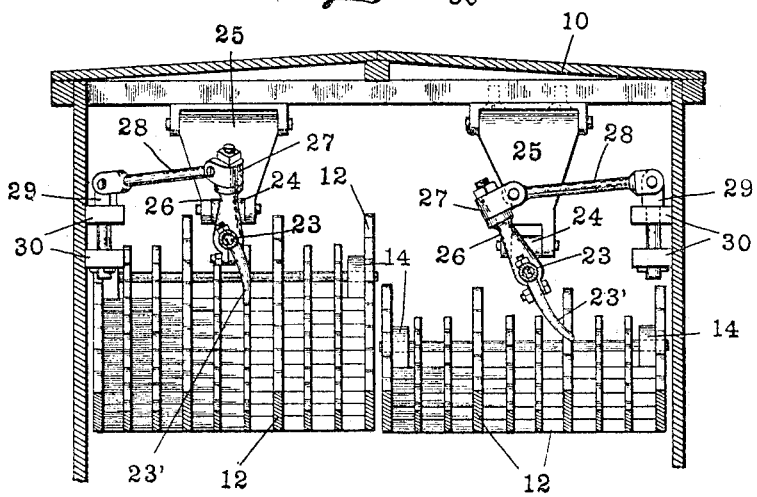
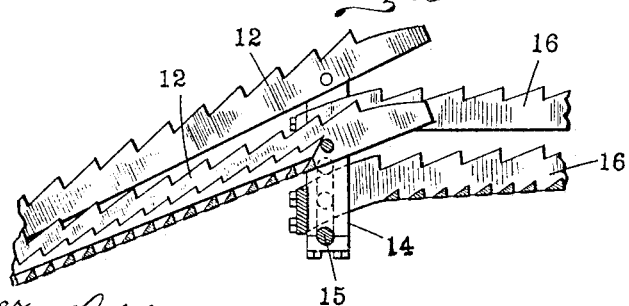
Witnesses
Inventor
Peter E. Good
BY
Bradford & Hood
Attorneys

UNITED STATES PATENT OFFICE.

PETER E. GOOD, OF ETNA GREEN, INDIANA.

SPREADER FOR THRESHING-MACHINES.

No. 798,957.

Specification of Letters Patent.

Patented Sept. 5, 1905.

Application filed January 21, 1905. Serial No. 242,159.

*To all whom it may concern:*

Be it known that I, PETER E. GOOD, a citizen of the United States, residing at Etna Green, in the county of Kosciusko and State of Indiana, have invented certain new and useful Improvements in Spreaders for Threshing-Machines, of which the following is a specification.

The object of my present invention is to provide means in a threshing-machine or separator to spread the incoming material from a narrow cylinder evenly over rake-bars of considerably greater width.

The accompanying drawings illustrate my invention.

Figure 1 is a vertical sectional view of a machine embodying my invention on the line 1 1 of Fig. 2. Fig. 2 is a plan with the top of the separator removed; Fig. 3, a section on line 3 3 of Fig. 1; Fig. 4, a partial plan, on an enlarged scale, of the parts shown in Fig. 2; Fig. 5, a section, on an enlarged scale, on line 5 5 of Fig. 1; and Fig. 6, an enlarged detail of the adjacent ends of the two sets of rake-bars.

In the drawings, 10 indicates a separator of any desired form provided with the usual separating-cylinder and concave 11. This cylinder and concave is, as usual, of less width than the machine proper and discharges upon a pair of rake-bar structures 12 12, which are of considerably greater width than the cylinder and concave and lead upward and backward therefrom. The rake-bar structures 12 12 are supported at their forward ends by upwardly-inclined links 13 and at their rear ends are carried by standards 14, which are carried by the cranks of a usual crank-shaft 15. Running backward from the rear ends of the rake-bar structures 12 12 are corresponding rake-bar structures 16 16, the forward ends of which are attached each to one of the standards 14 and at their rear ends are carried by upwardly-inclined links 17.
For the purpose of spreading the material evenly over the rake-bar structures 12 12 I mount above the forward ends of said rake-bars, immediately to the rear of the cylinder and parallel therewith, a crank-shaft 20, provided with a pair of cranked portions 21. Journaled upon each crank-shaft 21 is a block 22, in which is journaled one end of a finger-shaft 23, said shaft extending at right angles to the shaft 20 rearward and upward over one of the rake-bar structures 12. The rear end of each finger-shaft 23 is journaled in a block 24, which is pivotally attached to the lower end of a swinging link 25, which link is suspended from the casing 10. The pivotal axis of each link 25 and the block 24, attached thereto, are at right angles to the finger-shaft 23 and parallel with the crank-shaft 20. Secured to each finger-shaft is an upwardly-extending arm 26, to the upper end of which is swiveled a block 27 on an axis at right angles to the axis of the finger-shaft. Hinged to the block 27, at right angles thereto and also at right angles to the finger-shaft 23 on an axis parallel to said shaft 23, is a link 28. This link extends transversely outward toward the adjacent side of the casing 10 and is pivoted upon a substantially horizontal axis to the upper end of a pin 29, the shank of which is substantially vertical and journaled in suitable bearing-blocks 30, attached to the casing 10. Each finger-shaft 23 carries a plurality of fingers 23', which extend downwardly toward the rake-bar structure 12.

The shaft 20 is driven in the direction indicated by the arrows in Figs. 1 and 4 by any suitable means, so that the finger-shafts 23 will have their forward ends revolved about the axis of the shaft 20, while the rear ends swing on the links 25. At the same time, owing to the arm 26, block 27, link 28, and pin 29, each shaft 23 will be also oscillated about its own axis, so that the fingers 23' will be first swung toward the center of the machine, as shown at the upper left-hand corner of Fig. 2, then moved downward toward the adjacent rake-bar structure, and thence rearward and outward to the position shown in Fig. 4 and in the lower left-hand corner of Fig. 2, thus spreading the straw from the center rearward and outward, first toward one side and then toward the other.

I claim as my invention—

1. In a separator, the combination, with threshing means and receiving means arranged to the rear thereof, of spreading means arranged above said receiving means, said spreading means consisting of a crank-shaft, a finger-shaft extending rearward over the receiving means, a bearing-block journaled on the crank and forming a journal for the finger-shaft, a journaling supporting means for the opposite end of the finger-shaft, an arm carried by the finger-shaft, and a link pivoted at one end to the finger-shaft and at the other end to a stationary support.

2. In a separator, the combination, with threshing means and receiving means arranged to the rear thereof, of spreading means arranged over said receiving means and consisting of a crank-shaft, a finger-shaft, a block journaled on the crank of the crank-shaft and forming a journal-bearing for the finger-shaft, a link pivoted to a stationary support, a block pivoted to said link and forming a journal-bearing for the other end of the finger-shaft, an arm carried by the finger-shaft, and a link swiveled to said arm at one end and swiveled to a support at the other end, substantially as and for the purpose set forth.

3. A spreader for separators consisting of, a crank-shaft, a finger-shaft extending rearward over the receiving means, a bearing-block journaled on the crank and forming a journal for the finger-shaft, a journaling supporting means for the opposite end of the finger-shaft, an arm carried by the finger-shaft, and a link pivoted at one end to the finger-shaft and at the other end to a stationary support.

4. A spreader for separators consisting of, a crank-shaft, a finger-shaft, a block journaled on the crank of the crank-shaft and forming a journal-bearing for the finger-shaft, a link pivoted to a stationary support, a block pivoted to said link and forming a journal-bearing for the other end of the finger-shaft, an arm carried by the finger-shaft, and a link swiveled to said arm at one end and swiveled to a support at the other end, as and for the purpose set forth.

In witness whereof I have hereunto set my hand and seal, at Etna Green, Indiana, this 31st day of December, A. D. 1904.

PETER E. GOOD. [L. S.]

Witnesses:
BERT CLAYCOMB,
HENRY W. ROCKHILL.